Dec. 16, 1941.    W. J. WACHOWITZ    2,266,133
TANK
Filed Sept. 4, 1937    4 Sheets-Sheet 2
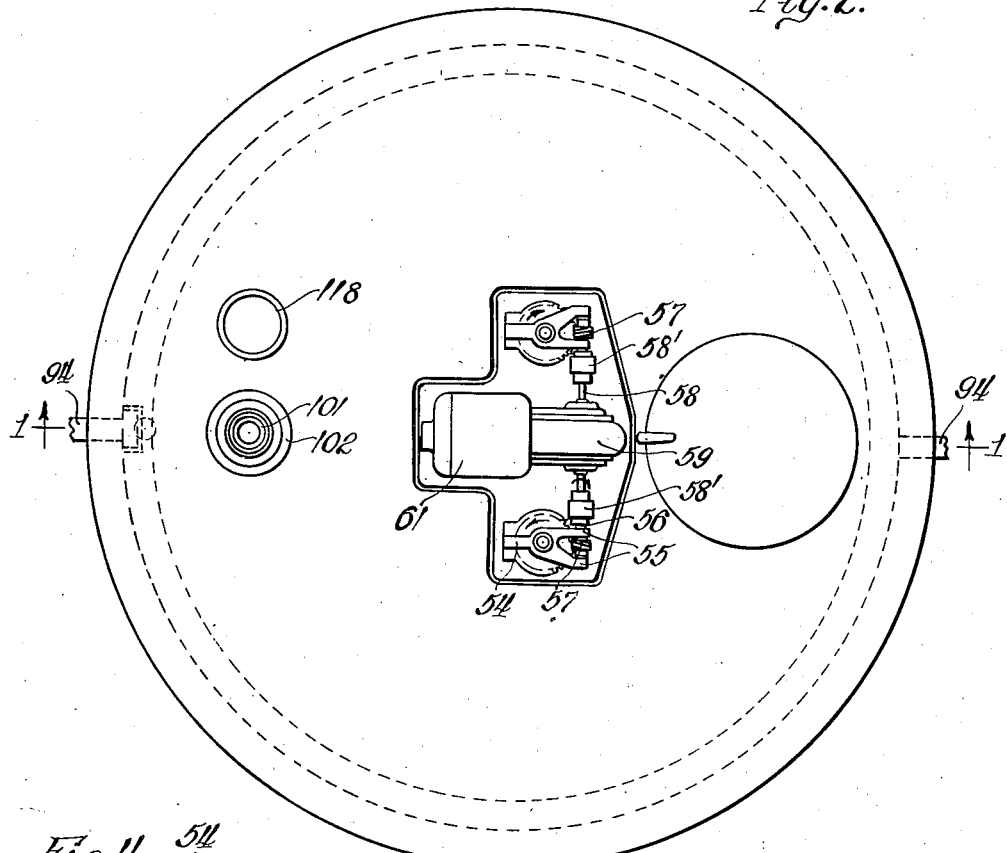
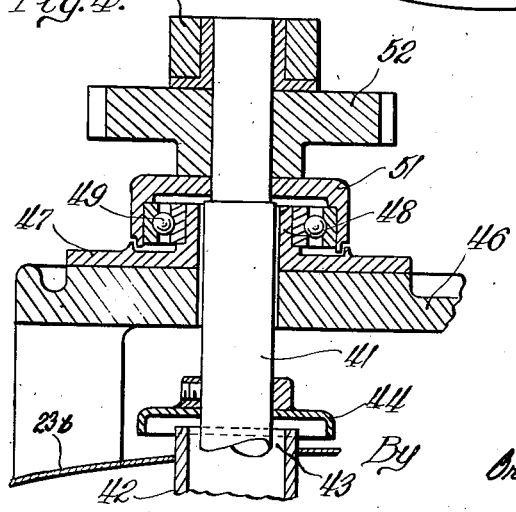
Inventor
Walter J. Wachowitz
By
Attys Dec. 16, 1941. W. J. WACHOWITZ 2,266,133
TANK
Filed Sept. 4, 1937 4 Sheets-Sheet 3
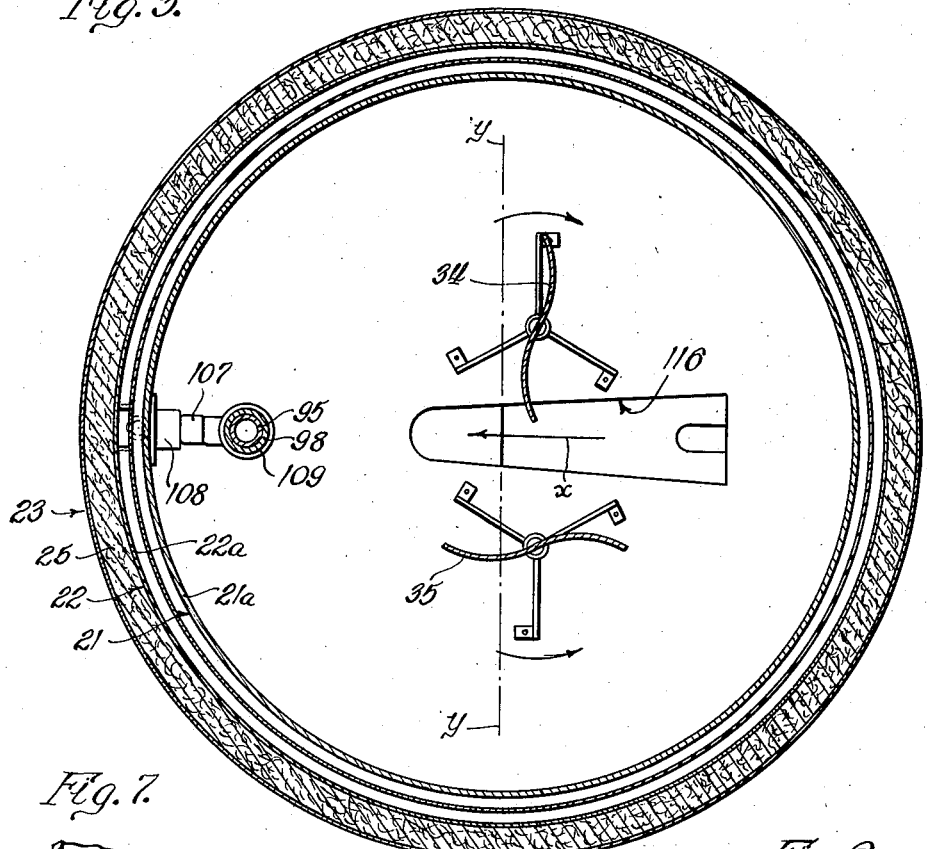
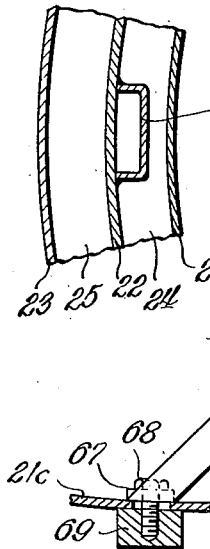
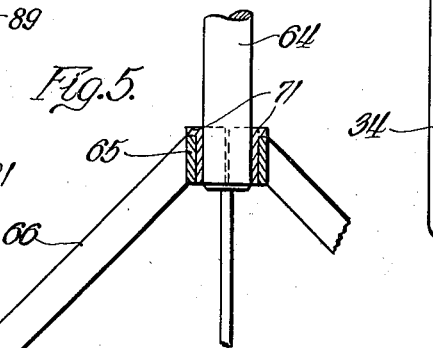
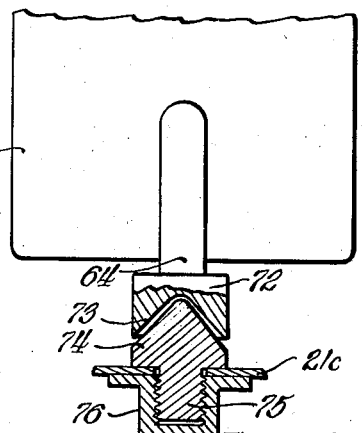
Inventor
Walter J. Wachowitz
By Brown, Jackson, Boettcher & Dienner
attys Dec. 16, 1941.  W. J. WACHOWITZ  2,266,133
TANK
Filed Sept. 4, 1937  4 Sheets-Sheet 4

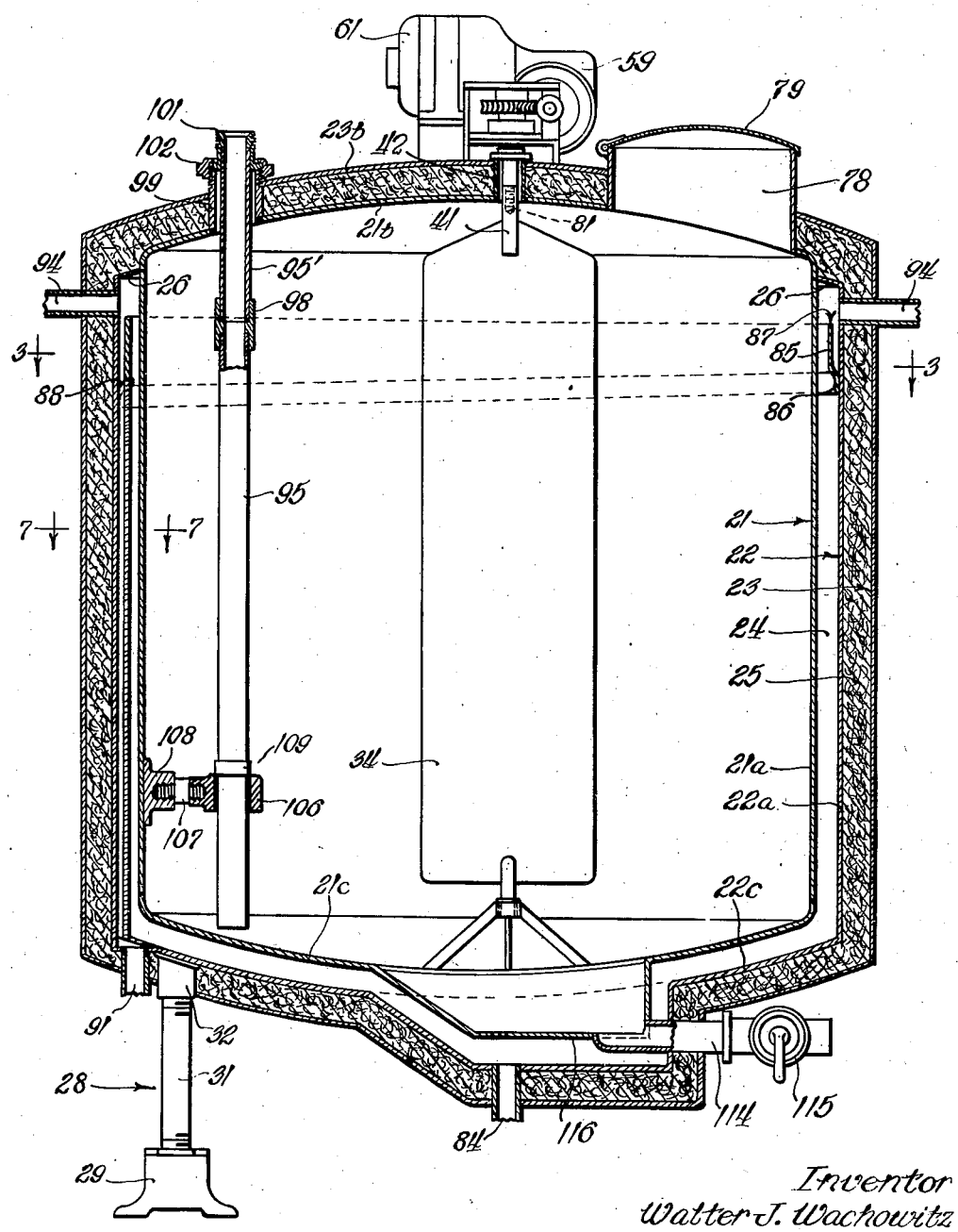

Inventor
Walter J. Wachowitz
By Brown, Jackson, Boettcher & Dienner
Attys.

Patented Dec. 16, 1941

2,266,133

UNITED STATES PATENT OFFICE 2,266,133

TANK

Walter J. Wachowitz, Waukesha, Wis.

Application September 4, 1937, Serial No. 162,403

3 Claims. (Cl. 259—104)

The present invention relates to an improved construction of tank which has been devised primarily for the processing of buttermilk wherein heating, cooling, and agitating operations are performed in a certain sequence. While this is the principal field of utility of my invention, it can also be employed for processing or storing milk, cream, ice cream mixes, and other food commodities.

One of the principal objects of the invention is to provide improved agitating means for the purpose of commingling the contents of the tank, and also for the purpose of effecting a heat interchange to raise or lower the temperature of the contents. Such agitating means comprises vertically extending agitating surfaces which result in the same degree of agitation being established substantially at all levels in the tank, whereby a uniform agitation of all portions of the liquid contents is insured. Furthermore, such agitating surfaces assure a uniform and effective agitation irrespective of whether the tank is only partly full or is entirely full. The contents of the tank are adapted to be heated or cooled by contact with the outer wall of the tank, which is surrounded by a jacket through which a heating or cooling medium is circulated. My improved agitating means serves to obtain a relatively high rate of heat exchanging contact between the contents of the tank and said outer wall, whereby the temperature of the contents can be raised or lowered in a relatively short space of time. In its preferred embodiment, said agitating means comprises two oppositely rotating agitators which insure a maximum degree of displacement between the inner and outer portions of the liquid batch, so that all portions of the batch are continuously brought into contact with the outer wall of the tank for heat interchange. Such arrangement is advantageous over the use of a single agitator, because in the latter type of construction the entire batch tends to partake of the rotary movement of the agitator, and hence there is not the same degree of displacement between the inner and outer portions of the batch. The oppositely rotating agitators of my invention have an improved arrangement of curved surfaces which also insure a maximum degree of displacement between the inner and outer portions of the batch.

Another object of the invention is to provide improved means for obtaining a uniform flow of the heating or cooling medium throughout all portions of the jacket surrounding the tank. In most prior constructions employing a surrounding jacket, there is a tendency for the heating or cooling medium to have the greatest rate of flow through that portion of the jacket which constitutes the shortest path between the inlet and outlet ports of the jacket. Hence, there are zones or areas where the flow is relatively low or practically nil, with the result that some portions of the wall of the tank are at different temperatures than other portions. This is avoided in my improved construction by causing the heating or cooling medium to flow in an upward direction in the jacket and by having its discharge occur into an annular spill-over channel which completely surrounds the upper portion of the jacket. The spill-over edge of this channel is horizontal, so that an equal discharge occurs at all points around said edge, thus assuring an equal rate of upward flow at all points around the jacket.

Other objects and advantages of the invention will appear from the following detailed description of one preferred embodiment thereof. In the accompanying drawings illustrating such embodiment—

Figure 1 is a vertical axial sectional view of my improved tank, taken approximately on the plane of the line 1—1 of Figure 2;

Figure 2 is a plan view of the tank;

Figure 3 is a horizontal sectional view taken approximately on the line 3—3 of Figure 1;

Figure 4 is a detail sectional view showing the mounting of each upper agitator shaft and the drive thereto;

Figure 5 is a fragmentary sectional view showing a pedestal type of bearing for each lower agitator shaft;

Figure 6 is a similar sectional view showing a modified construction of lower bearing;

Figure 7 is a detail sectional view taken approximately on the plane of the line 7—7 of Figure 1.

Figure 8:
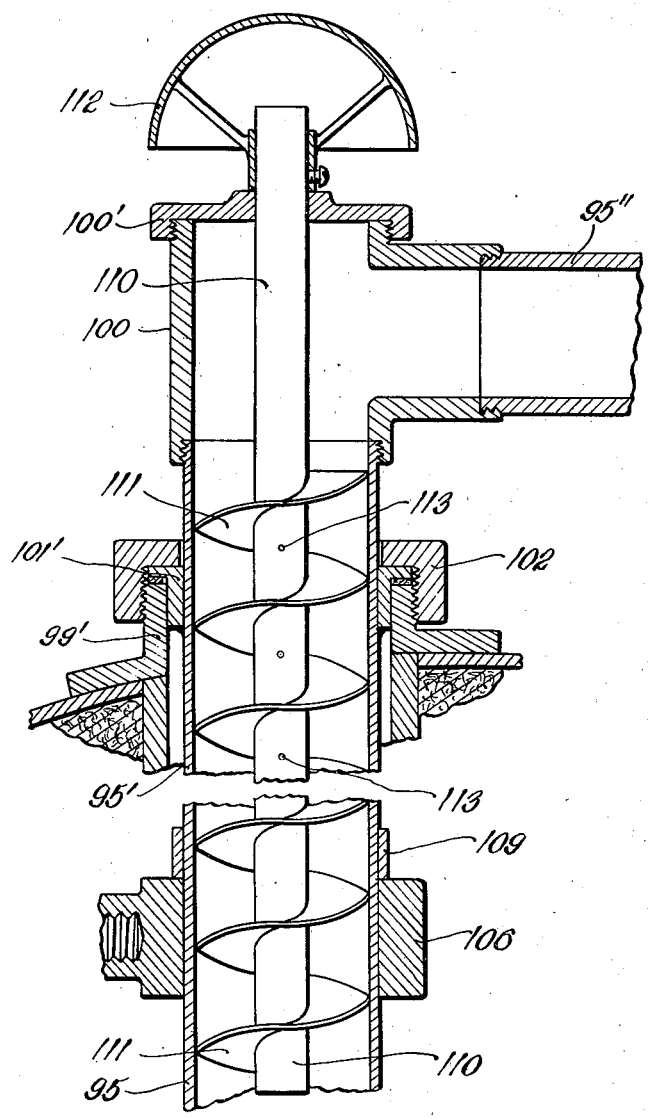
Figure 8 is a fragmentary sectional view on a larger scale showing a modified form of inlet conduit.

Referring to Figure 1, the tank of my invention comprises three concentric shells 21, 22 and 23. The inner shell 21 constitutes the container or tank proper for receiving the liquid to be treated. The space between the inner and intermediate shells 21 and 22 constitutes a jacket space 24 through which the temperature controlling liquid is circulated. The space between the intermediate and outer shells 22 and 23 is filled with a heat insulating material 25, preferably consisting of cork, although any other desired heat insulating material may be employed. The inner shell 21 is preferably constructed of "Allegheny metal" or any other stainless steel or alloy which is resistant to the action of milk or cream, ice cream mixes, and foods of like nature. The cylindrical portion 21a of the inner shell is secured to the upper and lower heads 21b and 21c by welded joints which are immune to the action of lactic acids, etc., these joints being ground down and polished off smooth with the inner surface of the container, thus eliminating any unevenness or projections which might provide lodgment for particles of milk fat or food and breeding places for bacteria. The intermediate shell 22 also has its cylindrical portion 22a preferably secured to the bottom head 22c by a welded joint to insure a water-tight jacket space 24, the upper portion of this intermediate shell being secured to the inner shell 21, as indicated at 26. Suitable spacing members, interposed between the lower portions of the inner and intermediate shells, transmit the weight of the inner shell and its contents to the intermediate shell. The tank is mounted on four pedestal supports 28, each comprising a base casting 29, a length of threaded pipe 31, and a nipple 32, the latter having flanged attachment to the bottom head 22c of the intermediate shell. The opposite ends of the pipe section 31 are reversely threaded so that rotation of this pipe section serves to adjust the tank to get it perfectly level.

The agitating means comprises two vertically disposed baffles 34 and 35, both extending from the lower portion of the tank substantially to the upper end thereof. As shown in Figure 3, each of these agitator baffles consists of a relatively thin metallic plate having its oppositely extending vane portions reversely curved in a gradual arcuate curve. The two agitators revolve in opposite directions, and the vane portions are so curved with respect to such directions of rotation that the convex surfaces of the vanes constitute the leading surfaces, whereby the agitators exert an outward impelling or displacing action on the liquid contents within the central zone of the tank. The two baffles are preferably timed so that the vanes thereof are approximately 90 degrees out of phase to each other in their rotation, and their axes are preferably spaced sufficiently far apart so that their circles of revolution clear each other. This timed relation and spaced mounting of the baffles or agitators avoids a high velocity constricted area between them, thereby minimizing the creation of whirlpools, vortices, and other turbulent formations. It will be further noted that the circle of revolution of each agitator is spaced a substantial distance from the nearest side wall of the tank, thereby also avoiding high velocity constricted areas between the agitators and said side walls, and further minimizing whirlpools, vortices, and objectionable turbulent action. It will be evident that the opposite directions of rotation of the two agitator blades will induce some degree of flow through the zone defined between the agitator axes, the direction of such flow being indicated by the arrow x. Tests conducted in tanks of relatively large diameter with the axes of the two agitators 34 and 35 located on a diametrical line of the tank, such as on the line y—y, show that with the agitators revolving in the directions indicated, there is a tendency to form one or more small whirlpools or vortices in the liquid contents at points to the left of such diametrical line. Any such whirlpools or vortices are objectionable in the operations of processing buttermilk, cream, etc., because they tend to draw air down into the mixture, whereas it is one of the objects in my processing of such commodities to expel entrained air from the mixture rather than to introduce it. I have found that such whirlpools or vortices can be eliminated by displacing the axes of the two agitators, so that, with the agitators rotating in the directions indicated, a line drawn through the axes of said agitators will be spaced to the right of the diametrical line y—y. The desired degree of such spacing will be dependent upon the diameter of the tank. This offset disposal of the agitator axes also avoids the likelihood of establishing a relatively low velocity area lying in line with the inlet end of the path of flow indicated by the arrow x and in contact with the wall of the tank, which area might not have as high a rate of flow or displacement as in other portions of the tank. Such offset disposal of the agitator axes is not essential to the successful operation of my improved apparatus but is of real advantage in tanks of relatively large diameter.

The efficiency with which the liquid contents of such a tank are agitated for effecting heat interchange through the walls of the tank can be readily computed by noting the time required to effect a predetermined change of temperature of a given quantity of liquid within the tank, based upon a known rate of flow of the heating or cooling medium through the jacket 24, with such heating or cooling medium maintained at a certain temperature. Tests based on this procedure indicate that the curvature of the agitator vanes is an important factor in the heat exchanging efficiency of the apparatus. Best results have been obtained where the vane portions of a baffle having an overall span of from 17 to 20 inches are curved on a radius of approximately 10 inches, struck from a center disposed approximately midway between a diametrical line and a line parallel thereto and tangential to the outer circle of revolution. However, I wish it to be understood that such proportions are not to be regarded as limitative of the invention, but have been given primarily for the purpose of affording a complete disclosure of the invention. My improved agitators produce substantially the same degree of agitation at all levels in the tank, and hence the agitation is equally effective whether the tank is entirely full or only partly full, which is an advantage not attainable with many prior agitators, particularly those of the propeller type. It is within the purview of my invention to employ only a single agitator of the construction shown disposed substantially centrally in the tank, although such embodiment does not secure as effective agitation because of the tendency of the liquid contents to partake of the rotary motion of such single agitator.

Secured to the upper ends of both agitators are shafts 41 (Figure 4), each of which extends upwardly through a tube 42 welded to the heads 21b and 23b of the inner and outer shells. Each shaft 41 is spaced from its associated tube 42 to provide an annular breathing passage 43 communicating between the interior of the tank and atmosphere, the upper end of each tube 42 projecting slightly beyond the upper head 23b to prevent condensate or dirt from entering the breathing channel 43. A protecting cap and slinger 44 is secured to each shaft 41 in spaced relation to the upper end of the tube 42, such cap having a depending annular flange which prevents condensate or lubricant from working down along the shaft into the tank. Both shafts 41 extend upwardly through holes in opposite ends of a platform casting 46, which is suitably secured to the top of the tank and on which are mounted the electric motor and the speed reducing gearing for driving the agitators. Each shaft also extends upwardly through a mounting plate 47 which is secured to the platform 46 and which has a shouldered hub 48 for mounting the inner race of an anti-friction bearing 49. A bearing housing 51 mounted on the shaft 41 encloses the bearing 49 and is provided with an internal annular shoulder seating on the outer race of said bearing. Rigidly secured to the shaft 41 and abutting the bearing housing 51 is a worm wheel 52. The weight of the agitator is transmitted through the gear wheel 52 and bearing housing 51 to the anti-friction bearing 49, so that the weight of the agitator is suspended on said bearing, the latter also carrying the radial loads of the shaft 41. The upper end of each shaft 41 is journaled in a bearing bracket 54 which has suitable attachment to the platform 46. As shown in Figure 2, each of these bearing brackets has a forked portion providing spaced bearings 55 for mounting a shaft 56. A worm 57, secured to the shaft 56 between the bearings 55, meshes with each worm wheel 52. Releasable couplings 58' connect the shafts 56 with the opposite ends of a shaft 58 extending outwardly from the sides of a speed reducing gear housing 59. Worm gearing or any other suitable type of speed reducing gearing within the housing 59 transmits a drive from the electric motor 61 to the shaft 58. The agitators can be driven at any desired speed, depending upon the commodity being agitated, the size of the tank, etc., but for the processing of buttermilk and cream I find that best results are obtained when the agitators are revolved at a speed approximately in the range of from fifteen to thirty revolutions per minute.

To provide laterally guided support for the lower end of each agitator, a lower shaft 64 extends downwardly therefrom for engaging in a step bearing 65 (Figure 5). This bearing comprises tripod supporting legs 66, each provided at its lower end with a laterally extending attaching foot 67 through which extends an anchoring screw 68. Each of these screws threads into a closed-bottom bore in an anchoring block 69 which is welded to the under side of the bottom head 21c. Interposed between the shaft 64 and bearing boss 65 is a bearing bushing 71 which is split longitudinally into separately removable halves. By such construction, said bearing bushing can be readily removed for affording direct access to all of the surfaces of the bearing assembly when cleaning or sterilizing the interior of the tank.

Figure 6 illustrates a modified construction of foot bearing for the lower end of each agitator, which may be employed in lieu of the construction illustrated in Figure 5. In this modified construction, the lower shaft 64 carries an enlarged hub portion 72 in which is formed a tapered bearing socket 74 disposed over a tapered bearing plug 74. The latter has a threaded shank 75 which screws into a closed-bottom bore formed within an anchoring block 76 which is welded to the under side of the bottom head 21c. The thread on the shank 75 has a direction such that the rotation of the associated agitator will not tend to unscrew the bearing plug 74. This construction of bearing enables the agitator baffles to be extended down into close proximity to the bottom of the tank; and the tapered bearing socket 73 can be readily cleaned, and, in fact, is practically self-cleaning because of its inverted relation. The agitators can be inserted into and removed from the tank through a manhole 78 provided in the top of the tank, this manhole having a suitable cover 79. The upper shaft 41 of each agitator is divided into two sections which are coupled together by a threaded joint indicated at 81 in Figure 1, whereby to facilitate the connection and disconnection of the agitators from the driving mechanism.

Referring now to the circulation of the heating or cooling medium through the jacket space 24, it will be seen from Figure 1 that a conduit 84 opens into the lowermost point of the jacket substantially centrally of the tank, this conduit serving both as an inlet and as a drain for the jacket. Heating or cooling medium entering through said conduit flows upwardly through the jacket to the upper portion thereof where it discharges into a spill-over channel or trough 85. Said channel extends entirely around the upper portion of the jacket space and has an outwardly and downwardly bent attaching flange 86 which is welded to the intermediate shell 22. The top edge 87 of the member 85 is horizontal so as to constitute an annular spill edge or lip, over which the heating or cooling medium will spill in a flow which is uniformly distributed at all points around the spill channel. The bottom portion of the trough defined between this channel member 85 and the shell 22 slopes downwardly toward one side of the tank, as indicated in dotted lines in Figure 1. At the lowermost point of said trough, a discharge opening 88 in the lower portion of the channel member communicates with a discharge conduit 89 extending downwardly through the jacket space. As best shown in Figure 7, this discharge conduit preferably comprises a channel having its lateral flanges welded to the shell 22, the upper end of said channel being welded to the member 85. The lower end of the discharge channel 89 communicates with a discharge outlet 91 extending downwardly through the bottom of the tank. The circulation of the heating or cooling medium through the jacket is limited to a rate such that the spill-over trough 85 always has ample capacity to carry off the discharge, so that this trough never becomes full. As previously remarked, by virtue of the uniform rate of spill at all points around the edge 87, there will necessarily ensue a uniform rate of upward flow at all points within the jacket space 24. Hence, all portions of the container shell 21 will be uniformly heated or cooled by the flow of the medium, the absence of localized areas of higher or lower temperature enabling the heating or cooling function to be performed more rapidly. The heating or cooling medium ordinarily consists of water, although for relatively low temperature cooling operations, brine or other refrigerants may be employed.

If desired, one or more safety outlets 94 may be extended from the upper portion of the jacket space, above the spill-over channel 85, the purpose of these outlets being to prevent the development of any injurious pressures in the jacket space 24 if the normal discharge flow through the outlet 91 should become blocked.

The liquid to be processed is introduced into the tank through the inlet conduit 95, shown in Figure 1. This conduit comprises two or more sections detachably coupled together by coupling collars 98. The upper section 95' extends upwardly through a nipple 99 which is welded to the upper heads 21b and 23b of the inner and outer shells. Secured to the upper conduit section 95' is a ferrule 101 having an outwardly projecting flange at its lower end provided with a beveled seat for engaging on a cooperating beveled seat formed on the upper end of the nipple 99. A union nut 102 engages over said flanged lower end of the ferrule 101 and screws down over an outer thread on the nipple 99. Upon the removal of the nut 102, the entire conduit 95 can be lifted out of the tank through the nipple 99 when it is desired to clean and sterilize this inlet conduit. The separation of said conduit into a plurality of sections enables the conduit to be taken apart for removal where the overhead clearance is obstructed by a low ceiling, and also enables the sections to be introduced into a sterilizing chamber of smaller size than the length of the entire conduit. To prevent the lower end of the conduit from being deflected objectionably by the surging motion of the liquid contents in the tank during the agitation, the lower end of the conduit is adapted to be passed down through a bracket ring or pipe clamp 106. The latter is secured to a stud 107 which threads into a fixture 108 welded to the inner shell 21. A collar 109, secured to the lower conduit section, is adapted to rest on the upper edge of the supporting ring 106, whereby to support the weight of the inlet conduit on said ring so that slip joints in the coupling collars 98 will not become separated during the agitation of the liquid contents.

In Figure 8 I have illustrated a modified construction of inlet conduit 95. This construction is the same as that previously described except that an air venting tube 110 extends centrally through the conduit 95, and a helical ribbon 111 is disposed between this air venting tube and the conduit. The upper section 95' of the conduit has a collar 101' secured thereto for clamping engagement against the upper end of the nipple 99' by the union nut 102, substantially as previously described. This upper conduit section has detachable threaded engagement with a tee connection 100 which establishes communication with a laterally disposed section 95" of the inlet conduit. The air venting tube 110 extends out through a cap 100' screwing over the upper branch of the T connection 100, and mounted on the open upper end of said tube 110 is a protecting hood or cap 112 which prevents the entrance of dirt into said tube. The relationship might be reversed by continuing the conduit 95 straight up and having the vent tube 110 extend laterally out through the side wall of the conduit. The helical ribbon 111 extends throughout all or the major portion of the conduit and causes a gradual descent of the liquid into the tank so that air is not entrained in the liquid; as distinguished from spilling the liquid down through a vertical pipe, which usually entraps a substantial quantity of air. A series of small holes 113 are provided in the tube 110 so that any air liberated from the liquid in the flow of the liquid down the spiral ribbon 111 can be vented directly into the tube 110.

The liquid contents are adapted to be discharged from the tank through a substantially horizontal outlet conduit 114 connecting with an outlet valve 115. The inner portion of the conduit 114 has a notched end which is welded to the lowermost portion of a depressed sump or trough 116 which is formed in the bottom head 21c of the inner shell, the bottom heads of the intermediate and outer shells being depressed correspondingly to accommodate this sump. As best shown in Figure 3, said sump is of elongated formation, so that no whirlpool or vortex can form in the liquid during its discharge from the tank, the avoidance of such whirlpool permitting of a more rapid discharge of the liquid and also preventing the introduction of air into the liquid. The horizontal disposal and location of the outlet conduit 114 and valve 115 renders the valve readily accessible, so that it is not necessary to crawl under the tank to discharge its contents.

Entering the top of the tank is a peep sight or observation window 118 through which the contents of the tank can be observed, suitable provision being made for illuminating the interior of the tank at such times. The tank is also provided with a thermometer, preferably communicating with the interior thereof through the side wall. These features are fully disclosed in my prior Patent No. 1,985,702, issued December 25, 1934, and therefore need not be described in detail here. The tank is also preferably provided with a second manhole disposed in the lower portion of the side wall to facilitate entrance into the tank for the performance of cleaning and sterilizing operations.

While I have illustrated and described what I regard to be the preferred embodiment of my invention, nevertheless it will be understood that such is merely exemplary and that numerous modifications and rearrangements may be made therein without departing from the essence of the invention.

I claim:

1. In apparatus of the class described, the combination of a tank for receiving liquids, a pair of substantially vertical agitators in said tank for causing the liquid to have circulatory contact with the side walls of said tank, and driving mechanism for rotating said agitators, each of said agitators comprising substantially continuous vertical vanes extending the length of the tank disposed approximately in diametrically opposite relation, said two agitators rotating in opposite directions through circles of revolution which are relatively close together but clear each other, and each circle of revolution being spaced more than half its diameter from the nearest adjacent wall of said tank so as to avoid high velocity restricted areas tending to produce objectionable turbulence therebetween, said agitators being timed so that the vanes of one agitator rotate substantially ninety degrees out of phase with respect to the vanes of the other agitator so as to avoid turbulence therebetween, the shape of said vanes being of a substantially uniform degree of cylindrical curvature from top to bottom of the vanes so as to impel the liquid horizontally and substantially without imparting vertical motion thereto.

2. In apparatus of the class described, the combination of a tank for receiving liquids, a pair of substantially vertical agitators in said tank for causing the liquid to have circulatory contact with the side walls of said tank, and driving mechanism for rotating said agitators, each of said agitators comprising substantially continuous vertical vanes extending the length of the tank and disposed approximately in diametrically opposite relation, each vane having a convex forward surface which is the leading surface in the direction of rotation of said agitators, said two agitators rotating in opposite directions through circles of revolution which are relatively close together but clear each other and each circle of revolution being spaced more than half its diameter from the nearest adjacent wall of said tank so as to avoid objectionable turbulence therebetween, said agitators being timed so that the vanes of one agitator rotate substantially ninety degrees out of phase with respect to the vanes of the other agitator, the shape of said vanes being of a substantially uniform degree of cylindrical curvature from top to bottom of the vanes so as to impel the liquid horizontally and substantially without imparting vertical motion thereto.

3. In apparatus of the class described, the combination of a tank for receiving liquids, a pair of substantially vertical agitators in said tank for causing the liquid to have circulatory contact with the side walls of the tank, each of said agitators comprising substantially continuous vertical vanes extending the length of the tank and disposed approximately in diametrically opposite relation, means mounting said agitators with their axes offset from a diametrical line extending through the tank, and driving mechanism for oppositely rotating said agitators in such directions that the body of liquid in the zone between said axes is impelled toward said diametrical line, said two agitators rotating through circles of revolution which are relatively close together but clear each other, and each circle of revolution being spaced more than half its diameter from the nearest adjacent wall of said tank so as to avoid objectionable turbulence therebetween, said agitators being timed so that the vanes of one agitator rotate substantially ninety degrees out of phase with respect to the vanes of the other agitator, the shape of said vanes being of a substantially uniform degree of cylindrical curvature from top to bottom of the vanes so as to impel the liquid horizontally and substantially without imparting vertical motion thereto.

WALTER J. WACHOWITZ.